United States Patent [19]

Highfill

[11] Patent Number: 5,045,294

[45] Date of Patent: Sep. 3, 1991

[54] PROCESS FOR PREPARING MEDIUM DENSITY GRANULAR SODIUM PHOSPHATES

[75] Inventor: Louis A. Highfill, Union, Mo.

[73] Assignee: Monsanto Company, St. Louis, Mo.

[21] Appl. No.: 461,951

[22] Filed: Jan. 8, 1990

[51] Int. Cl.$^5$ .................... C01B 15/16; C01B 25/26
[52] U.S. Cl. .................... 423/315; 423/305; 423/311; 423/314
[58] Field of Search ............... 423/315, 305, 307, 308, 423/311, 314

[56] References Cited

U.S. PATENT DOCUMENTS

| | | | |
|---|---|---|---|
| 3,160,472 | 12/1964 | Metcalf | 423/315 |
| 3,761,573 | 9/1973 | Hinz et al. | 423/315 |
| 3,932,590 | 1/1976 | Pals et al. | 423/315 |
| 4,134,963 | 1/1979 | Pals | 423/315 |
| 4,251,498 | 2/1981 | Hensler et al. | 423/315 |

Primary Examiner—Gregory A. Heller
Attorney, Agent, or Firm—Raymond C. Loyer; Richard H. Shear; James C. Bolding

[57] ABSTRACT

A method of producing medium density granular sodium phosphates by agglomerating STP fines with mineral acids, drying the agglomerated fines and screening to recover the dry agglomerated fines.

7 Claims, No Drawings

5,045,294

PROCESS FOR PREPARING MEDIUM DENSITY GRANULAR SODIUM PHOSPHATES

FIELD OF THE INVENTION

The present invention relates to a method of preparing a mixture of sodium tripolyphosphate (STP), pyrophosphates, metaphosphates and orthophosphates. This mixture is hereinafter referred to as sodium phosphates (SP). More particularly, the present invention relates to a method of preparing medium density granular SP from STP fines by agglomerating the fines with a mineral acid such as phosphoric acid, hydrochloric acid or sulfuric acid.

BACKGROUND OF THE INVENTION

Most commercially available processes for producing STP produce undesirable fines which cause dusting and difficulties in handling the STP. The fines are typically removed from the larger granules by screening or other methods of separation. The fines are typically not pure STP, and can have up to 20 weight % of other phosphate compounds, such as metaphosphates, pyrophosphates and orthophosphates. The present invention provides a method of utilizing the fines by agglomerating them to produce medium density granular SP.

U.S Pat. No. 3,160,472 discloses the agglomeration of STP fines by calcining the fines in the presence of at least 10% of blends of certain alkali metal orthophosphate salts. U.S. Pat. No. 3,761,573 discloses the spraying of fines with an alkali metal orthophosphate solution to form particles, drying the particles, screening to recover the desired fractions and annealing the recovered particles. U.S. Pat. No. 3,932,590 discloses the spraying of STP fines with a solution of sodium orthophosates and calcining to produce granular STP. U.S. Pat. No. 4,134,963 discloses the agglomeration of STP fines by spraying with water, then calcining. U.S. Pat. No. 4,251,498 discloses the compaction, milling, moisturizing and calcining of STP fines to agglomerate the fines and produce a granular product.

None of the above patents disclose the present invention of agglomerating STP fines with mineral acids to produce medium density SP particles.

SUMMARY OF THE INVENTION

The present invention is a method of producing medium density granular SP by agglomerating STP fines with mineral acids such as phosphoric acid, hydrochloric acid or sulfuric acid, drying the agglomerated fines and separating the dry agglomerated fines to recover the granular SP.

DETAILED DESCRIPTION OF THE INVENTION

In formulating detergent compositions, granular SP has come into widespread use as a phosphate builder which increases the cleaning ability of the detergent compositions. In order for the SP to be useful as a builder, it is necessary for the particle size distribution and the bulk density of the SP be such that the detergent composition formulated with the SP is a free-flowing, essentially homogeneous composition.

The particle size of the agglomerated granules produced using the present method are typically in the range of 0 to 40% by weight +20 mesh, 15 to 100% by weight −20+100 mesh and 1 to 20% by weight −100 mesh. The bulk density of the agglomerated granules produced by the present method is in the range of about 0.7 to 0.85 g/cc, which is considered medium bulk density. This combination of particle size distribution and bulk density typically provides a granular SP with the desired free-flowing, essentially homogeneous composition.

It is desirable for the granular SP to have a neutral to slightly acidic pH in order for the detergent builder to be compatible with bleach. The pH of the agglomerated granules produced using the present method is in the range of about 6 to 8, i.e., near neutral to slightly acidic, when measured in a 1% by weight aqueous solution. Unagglomerated STP typically has a pH in the range of about 9.2 to about 10.0.

The frangibility of the granules relates to the particle strength. The lower the frangibility, the stronger the particle. Particles of low frangibility are desired to prevent fracturing of particles during mixing, handling and transporting the detergent formulations. Values below 20% are condsidered good and below 10% are excellent. The SP granules produced using the present method typically have a frangibility below 10%.

The STP fines used in the present invention are typically a by-product of the process used to produce granular STP. The fines are about 80 to 100% by weight −100 mesh.

The acid used for agglomerating the STP fines is a mineral acid or mixture of mineral acids, such as phosphoric acid, hydrochloric acid or sulfuric acid. If the agglomerated SP produced is to be used as a phosphate builder, phosphoric acid and sulfuric acid are the preferred mineral acids for agglomeration. These acids do not introduce into the builder or detergent composition ions that are not already present, nor is there a need to neutralize the acids used.

The amount of acid used is dependent upon the desired pH of the product. Typically, the desired pH is in the range of about 6 to about 8, i.e., near neutral to slightly acidic. The amount of acid necessary to achieve that pH is calculated, based on the pH of the STP fines (typically in the range of about 9.2 to 10.0), diluted with water and added to the fines. The acid is optionally diluted with water to afford better contact and distribution with the fines. The acid can be diluted in the range of 10/90 to 90/10 volume water/volume acid. A preferred dilution is 50/50.

The acid is mixed with the fines in any manner that provides intimate mixing of the liquid acid with the solid fines. Suitable methods of mixing include manual mixing or rotary mixing. The equipment used to effect mixing includes a Hobart mixer, a rotating horizontal drum hydrator or a food processor. Spraying is the preferred method of acid addition and may be done by any of the conventional spraying means, which incude air atomized or pneumatic spray nozzles.

The agglomerated fines can be dried by any convenient manner. Air drying is sufficient. Drying by circulating air, heated air or other means can also be used.

The dried agglomerated fines are recovered, generally by screening the product to isolate the desired fraction. For commercial purposes, the granular product fraction isolated is generally encompassed by the fraction −16 to +100 mesh. Oversized particles may be milled and then rescreened to recover the desired fraction. The agglomerated fines typically are a mixture of phosphates, the majority of the phosphates being a combination of STP and pyrophosphates. The mixture can be in the range of about 35 to 95 weight % STP, 0 to 10 weight % trimetaphosphates, 10 to 60 weight % pyrophosphates and 0 to 25 weight % orthophosphates.

The following examples are for illustrative purposes only and are not intended to limit the scope of this invention in any manner.

EXAMPLES

In the following examples, a Hobart mixer was charged with 1060 g of STP fines. The fines were analysed and found to be of the following composition: 90.4 weight % STP, 2.6 weight % trimetaphosphate, 6.8 weight % pyrophosphate and 0.2 weight % orthophosphate. A solution of the indicated acid was added to the mixer while operating at a slow speed over a period of about 2 min. The product was allowed to sit for about 1 min, when it appearanced to be dry. The product was screened to determine particle size distribution and tested for frangibility. The bulk density, pH and ability to sequester calcium was determined.

Frangibility was determined by placing 100 g of the dried product on a 100 mesh screen. Three balls about 2 inches (5.08 cm) in diameter were placed on the screen. The screen was placed on a Ro Tap sieve shaker (manufactured by W. S. Tyler, Inc.) and shaken for 15 min. The amount of material which passed through the 100 mesh screen was weighed, and the % by weight of the sample calculated.

The bulk density was determined by the Solvey Process Method 302A described in the Sovay Technical and Engineering Service Bulletin No. 9, issued in 1944.

The pH was determined by placing 1 g of the dry particles in 99 g of deionized water, and determining the pH using an Orion Research Ionalyzer Model 601A.

The sequestration of calcium was determined by potentiometric titration using a Metrohm E 436 Automatic Potentiograph and an E 436 D Automatic Feed Titrator, equipped with a calcium selective ion electode.

EXAMPLE 1

According to the above procedure, STP fines were agglomerated using 190 g of a 50 weight %/50 weight % mixture of a 85% $H_3PO_4$ and water solution. The granular product was screened and found to be:

| | |
|---|---|
| −14 | 1.25% |
| −20 | 14.50% |
| −60 | 86.50% |
| −100 | 97.00% |

The pH of the product was found to be about 7.87.

EXAMPLE 2

The same procedure was used as in Example 1, except a food processor was used for mixing the fines and the acid solution. The granular product was screened and found to be:

| | |
|---|---|
| −14 | trace |
| −20 | 4.80% |
| −60 | 93.50% |
| −100 | 97.80% |

The pH of the product was found to be about 6.89.

EXAMPLE 3

The same procedure was used as in Example 1, except that the acid solution used was 120 g of a 50 weight %/50 weight % mixture of concentrated sulfuric acid and water. The results of screening the granular product was essentially identical to those of Example 2. The pH of the product was found to be about 6.88.

The granular products prepared in Examples 1, 2 and 3 were analysed to determine the nature of the phosphates formed and found to be:

TABLE 1

| Example | Phosphate Analysis | | | |
|---|---|---|---|---|
| | STP | Meta | Pyro | Ortho |
| 1 | 68.0 | 2.2 | 25.0 | 0.4 |
| 2 | 45.7 | 0 | 40.4 | 13.9 |
| 3 | 39.7 | 2.6 | 50.0 | -- |

The frangibility of the granular products prepared in Examples 1, 2 and 3 was found to be less than 10%.

I claim:

1. A method of producing medium density granular sodium phosphates comprising agglomerating STP fines with mineral acids selected from the group consisting of phosphoric acid, hydrochloric acid and sulfuric acid, drying the agglomerated fines and separating the dry agglomerated fines to recover the granular sodium phosphates.

2. The method of claim 1 wherein the mineral acids are selected from the group consisting of phosphoric acid and sulfuric acid.

3. The method of claim 2 wherein the drying is accomplished by air drying at room temperature.

4. The method of claim 3 wherein the separating of the dry agglomerated fines is accomplished by screening.

5. The method of claim 4 wherein the agglomerated fines contain 35 to 95 weight % STP, 0 to 10 weight % trimetaphosphate, 10 to 60 weight % pyrophosphate and 0 to 25 weight % orthophosphate.

6. The method of claim 5 wherein the mineral acids are added in an amount sufficient to lower the pH to the range of 6 to 8, and the acid is diluted with water in the range of 10/90 to 90/10 volume water/volume acid ratio.

7. A method of producing medium density granular sodium phosphates comprising agglomerating STP fines with mineral acids selected from the group consisting of phosphoric acid and sulfuric acid, air drying the agglomerated fines at room temperature and separating the dry agglomerated fines by screening to recover the granular SP wherein the agglomerated fines contain 35 to 95 weight % STP, 0 to 10 weight % trimetaphosphate, 10 to 60 weight % pyrophosphate and 0 to 25 weight % orthophosphate.

* * * * *